United States Patent
Bang

(10) Patent No.: US 6,194,861 B1
(45) Date of Patent: Feb. 27, 2001

(54) CIRCUIT AND METHOD FOR SENSORLESS BRUSHLESS DIRECT CURRENT (BLDC) MOTOR

(75) Inventor: Seok-Hoon Bang, Seoul (KR)

(73) Assignee: Fairchild Korea Semiconductor Ltd. (KR)

( * ) Notice: Subject to any disclaimer, the term of this patent is extended or adjusted under 35 U.S.C. 154(b) by 0 days.

(21) Appl. No.: 09/330,617

(22) Filed: Jun. 11, 1999

(30) Foreign Application Priority Data

Jun. 22, 1998 (KR) ................................................ 98-23368

(51) Int. Cl.[7] ................................ G05B 19/28; H02P 1/23
(52) U.S. Cl. ............................ 318/603; 318/254; 318/607; 318/608
(58) Field of Search ..................................... 318/138–293, 318/603, 696; 324/158.1; 377/39

(56) References Cited

U.S. PATENT DOCUMENTS

| | | | |
|---|---|---|---|
| 5,072,166 | * | 12/1991 | Ehsani ................................... 318/696 |
| 5,144,209 | * | 9/1992 | Ingji et al. ............................ 318/254 |
| 5,172,036 | * | 12/1992 | Cameron ............................... 318/138 |
| 5,177,416 | * | 1/1993 | Inaji et al. ............................ 318/254 |
| 5,177,771 | * | 1/1993 | Glasssburn .............................. 377/39 |
| 5,182,499 | * | 1/1993 | Inaji et al. ............................ 318/254 |
| 5,196,775 | * | 3/1993 | Harris et al. .......................... 318/638 |
| 5,221,881 | * | 6/1993 | Cameron ............................... 318/254 |
| 5,231,338 | * | 7/1993 | Bulgarelli et al. .................... 318/254 |
| 5,294,877 | * | 3/1994 | Cameron ............................... 318/809 |
| 5,306,988 | * | 4/1994 | Carobolante et al. ................ 318/254 |
| 5,317,243 | * | 5/1994 | Cameron ............................... 318/254 |
| 5,382,890 | * | 1/1995 | Moh et al. ............................ 318/254 |
| 5,418,451 | * | 5/1995 | Maass et al. ....................... 324/158.1 |
| 5,451,832 | * | 9/1995 | Cameron et al. ..................... 318/375 |
| 5,517,095 | * | 5/1996 | Carobolante et al. ................ 318/254 |
| 5,808,436 | * | 9/1998 | Choi et al. ........................... 318/603 |

* cited by examiner

*Primary Examiner*—Paul Ip
(74) *Attorney, Agent, or Firm*—Blakely Sokoloff Taylor & Zafman

(57) ABSTRACT

A circuit for driving a sensorless BLDC motor is disclosed which checks whether or not the motor is rotating and then terminates the start up interval (or forced drive interval) in order to obtain efficient motor drive. The present invention is comprised of a comparator which receives a phase voltage through a first input terminal and receives a neutral point voltage through a second input terminal, and a flip-flop unit which is comprised of a plurality of flip-flop devices. Each flip-flop device is a means for receiving an output of the comparator through a clock signal input terminal, and a reset signal through a reset signal input terminal. The sensorless BLDC motor operates in a running mode when data provided to the input terminal of the first flip-flop means is output from the output terminal of the last flip-flop.

10 Claims, 2 Drawing Sheets

CIRCUIT AND METHOD FOR SENSORLESS BRUSHLESS DIRECT CURRENT (BLDC) MOTOR

BACKGROUND OF THE INVENTION (a) Field of the Invention

The present invention relates to a sensorless BrushLess Direct Current (BLDC) motor. More specifically, the present invention relates to a motor driving circuit and method for improving the efficiency of motor drive.

(b) Description of the Related Art

In driving a BLDC motor, current switching for each phase must be performed in a proper time in order to form a continuous rotor field of the BLDC motor, and a position of the rotor must be detected in order to properly perform current switching Therefore, devices for detecting the position of the rotor are needed, and among the devices in use are hall sensors or resolvers. However, the use of the sensors or resolvers involves a complicated circuit, and thereby, BLDC motors without hall sensors have been developed so as to decrease the inconvenience caused by appending hall sensors to motor control circuits.

BLDC motors without hall sensors detect the position of the rotor using the back electromotive force (BEMF) that results from the rotor rotation. However, when the motor starts to drive, the BEMF required for the check of rotor position needs to be generated. Therefore, a start up interval is necessary. The start up interval represents an initial and forced rotation period where the motor is rotated but the output is not engaged while the BEMF is generated.

In a sensorless BLDC motor, a start up interval is needed when the motor is still at standstill, but once the motor is rotating and generating BEMF on its own, the start up mode is no longer needed. However, just as in the case with conventional sensorless BLDC motors that restart after their power has been turned off, a disadvantage to efficiency can be found in that although the BEMF is generated the motor is rotating in the start up interval. That is to say, due to the need to rotate the motor in the start up forced drive period, both time and energy are wasted.

SUMMARY OF THE INVENTION

It is an object of the present invention to provide efficient motor drive by removing the BLDC motor initial and forced drive interval (i.e., start up interval) when the motor rotation is detected.

In one aspect of the present invention, the circuit for driving the sensorless BLDC motor is comprised of: a comparator which receives the voltage of a phase through a first input terminal, and the voltage of the neutral point through a second input terminal; and a plurality of flip-flops means in series which receive an output of the comparator through clock signal input terminals, and a reset signal through reset input terminals, respectively. When the data signal which is provided to the first flip-flop means is output from the last flip-flop means, the motor starts to drive by its running mode.

In another aspect of the present invention, the method for driving the sensorless BLDC motor comprises the steps of resetting a plurality of flip-flops means in series; inputting a data signal of first logical value to the first flip-flop means; comparing the voltage of a phase of the motor with the voltage of the neutral point, and generating clock signals according to the rotation counts of the motor; transmitting the data signal to a next flip-flop means according to the generated clock signals; and then driving the motor with its running mode.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
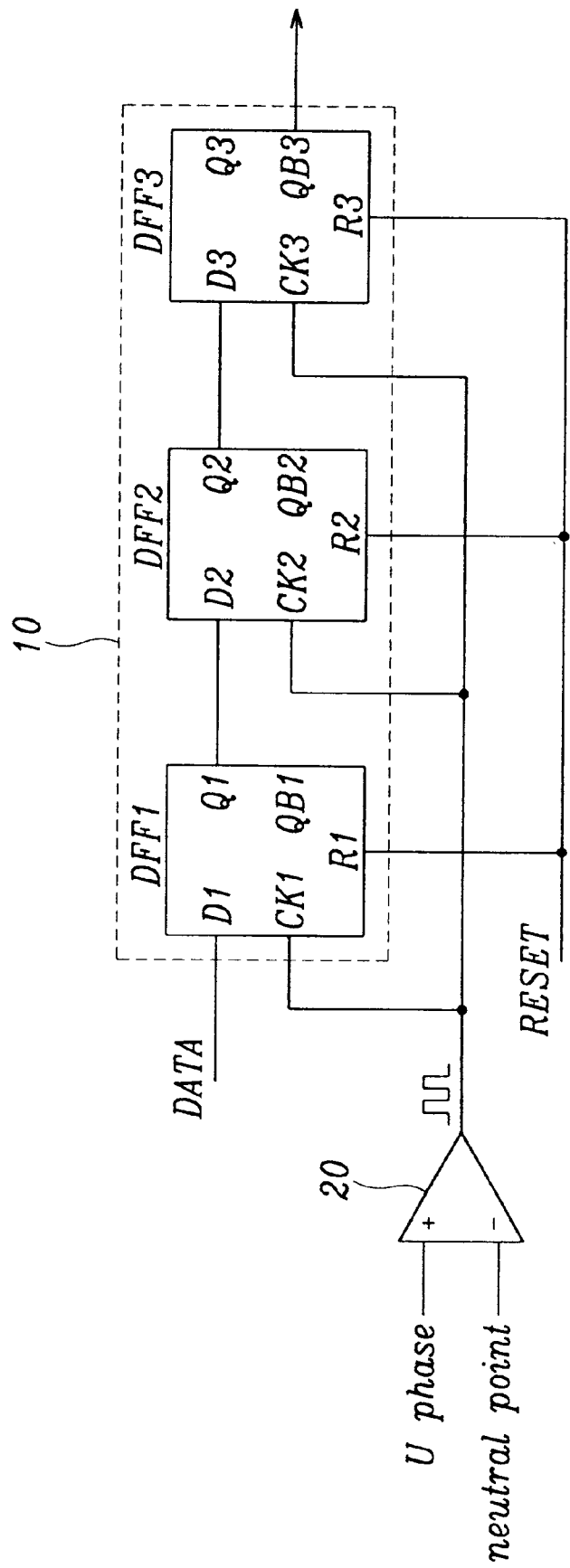
FIG. 1 is a schematic diagram of a circuit for driving a sensorless BLDC motor according to an embodiment of the present invention.

FIG. 1 shows a schematic diagram of a circuit for driving a sensorless BLDC motor according to the present invention, comprised of a flip-flop unit 10 and a comparator 20.

The flip-flop unit 10 is comprised of three D flip-flops means in series DFF1, DFF2, and DFF3. A data signal DATA is provided to the first flip-flip DFF1 through an input terminal D1, and a clock input terminal CK1 is coupled to an output terminal of the comparator 20, a reset signal is provided to the DFF1 through a reset signal input terminal R1. An input terminal D2 of the second flip-flop DFF2 is coupled to a noninverting output terminal Q1 of the first flip-flop DFF1, and a clock input terminal CK2 is coupled to the output terminal of the comparator 20, and the reset signal is provided to a reset signal input terminal R2. An input terminal D3 of the third flip-flop DFF3 is coupled to a noninverting output terminal Q2 of the second flip-flop DFF2, and a clock input terminal CK3 is coupled to the output terminal of the comparator 20, and the reset signal is provided to a reset signal input terminal R3, and an inverting output terminal QB3 is coupled to the motor. The flip-flops DFF1, DFF2, and DFF3 are enabled or disabled according to the input reset signal RESET.

The operation of the circuit for driving the sensorless BLDC motor will now be described.

An input voltage from among the motor input phases (U-, V-, or W) is provided to the noninverting terminal of comparator 20, while a neutral point voltage is provided to the inverting terminal of the same comparator 20. The comparator 20 compares both the inputs, and when the voltage of the phases is higher than the neutral point voltage, a high signal is output, and when neutral point voltage is equal to or higher than the voltage of the phases, a low signal is output. Therefore, when the motor is rotating, since the signal provided to the noninverting terminal oscillates with respect to the neutral point voltage, the comparator outputs pulses in which the high and low signals are repeated. Also, when the motor is stopped, the comparator output a continuous low signal.

In the drive circuit for the BLDC motor according to the present invention, the comparator compares the voltage of the phases with the neutral point voltage and thereby outputs a clock pulse, and using this clock pulse, it detects whether or not the motor is rotating.

When the reset signal is low, the outputs of the flip-flops means are reset. That is, the each output terminal Q1, Q2, and Q3 of the flip-flops means is set low, and the each inverse output terminal QB1, QB2, and QB3 are set high, and when the reset signal is high, the flip-flops means can process the input signals.

In the flip-flop unit 10, an adequate amount of flip-flops are arrayed to receive the clock signal caused by the rotation of the motor, so that the fact whether or not the motor is rotated is accurately checked.

Figure 2:
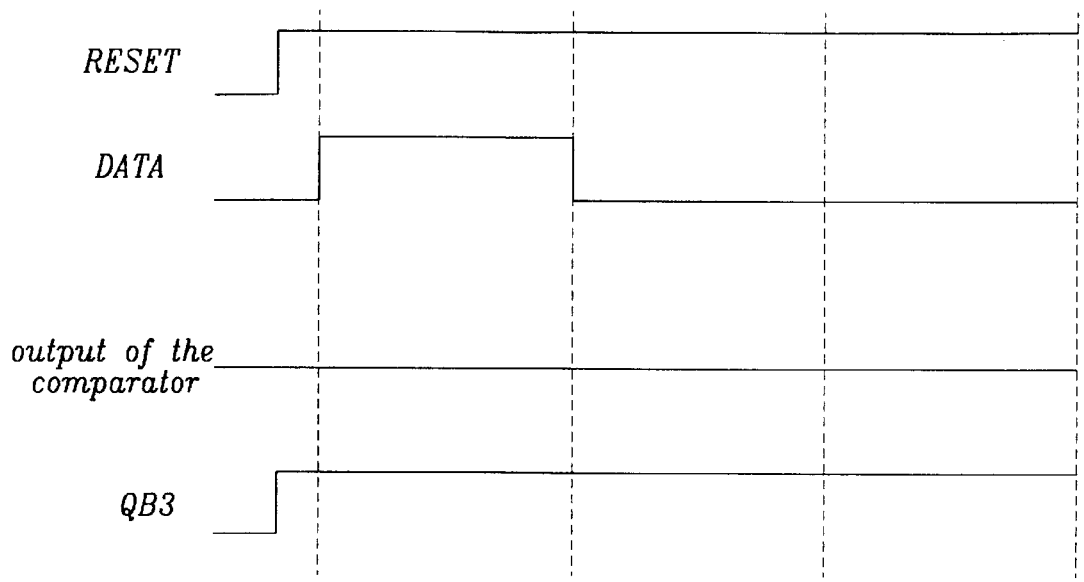
FIG. 2 illustrates a timing chart for the initial drive state of the BLDC motor when the motor is stopped.
Figure 3:
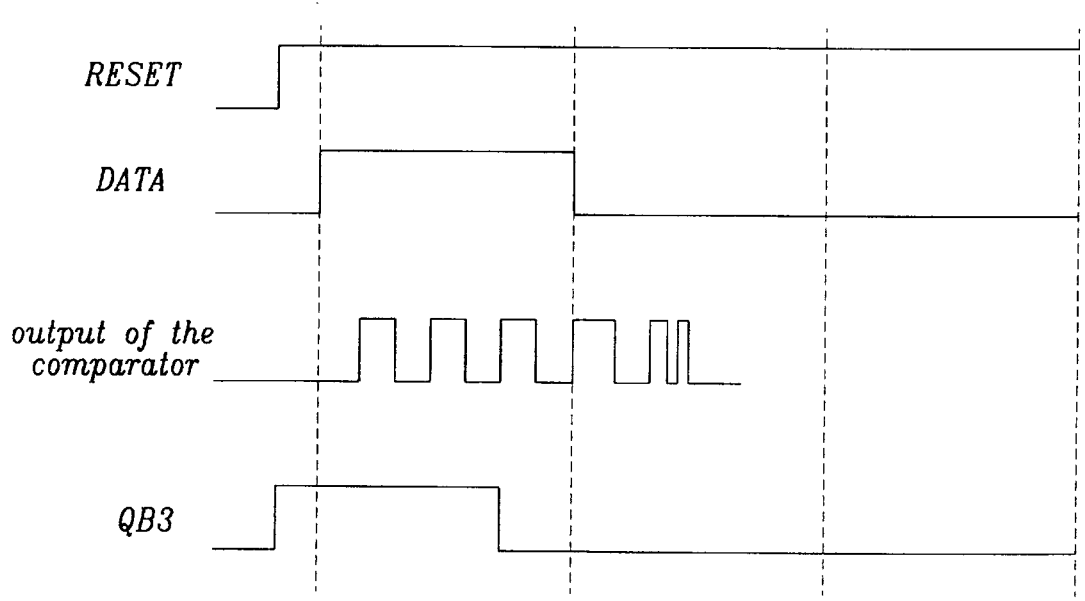
FIG. 3 illustrates a timing chart for an initial drive state of the BLDC motor when the motor is rotating.

Referring to FIGS. 2 and 3, the operation of the flip-flop unit 10 when the motor is rotating and when it is at standstill will be described. FIG. 2 shows a timing chart for an initial drive state of the BLDC motor when the motor is stopped, and FIG. 3 shows a timing chart for an initial drive state of the BLDC motor when the motor is rotating.

By the initial reset signal RESET, the noninverting output terminals are set low, and the inverting output terminals are set high. Drive modes of the motor are determined according to the value of the inverting output terminal QB3 of the last flip-flop means. That is, when the value of the inverting output terminal QB3 is high, the motor starts to drive by the start up mode, and when the value of the inverting output terminal QB3 is low, the motor is driven in the running mode. When the output terminals Q1, Q2, and Q3 of the flip-flops means are changed to a low signal by the initial reset signal, a high data signal DATA is provided, and this data signal is only transferred to a next flip-flop when the comparator generates clock signals. That is, when the clock pulse provided to the clock input terminal is changed from low state to high state, the flip-flop means outputs the input signal through its output terminal. The square wave clock pulses are provided to the clock input terminal, only when the motor is rotating.

The operation of the present invention will now be described when the motor is rotating and when it is stopped, considering the characteristics of the flip-flops means.

Referring to FIG. 2, when the motor is stopped, the comparator outputs no square wave signals. Therefore, since no clock signal is provided to the flip-flops means DFF1, DFF2, and DFF3, data is not output through the inverting output terminal QB3 of the third flip-flop means, and thereby, the inverting output terminal QB3 maintains its initial reset value, that is, a high value, and the motor starts to drive by the start up mode.

Referring to FIG. 3, when the motor is rotating, the comparator 20 generates square wave clock signals. Since the embodiment of the present invention use three flip-flops means in series, three or more square waves must be generated in order for the data to be transferred to the inverting output terminal QB3.

That is, when a square wave clock pulse is input, the data signal provided to the first flip-flop means through the input terminal D1 is provided to the output terminal Q1 of the first flip-flop means DFF1. However, until another square wave clock pulse is input, the data signal is not provided to the second flip-flop means DFF2.

The operation of the present invention when the square wave clock pulse is input twice will now also be described. When the first square wave clock pulse is input, the data signal provided to the first flip-flop means through the input terminal D1 is provided to the output terminal Q1 of the first flip-flop means DFF1, and when the second square wave clock pulse is input, the output signal of the first flip-flop means is provided to the output terminal Q2 of the second flip-flop means DFF2. However, unless another square wave clock pulse is input, the data is not provided to the third flip-flop means DFF3.

Finally, the operation of the present invention when the square wave clock pulse is input three times will now be described. When the first square wave clock pulse is input, the data signal provided to the first flip-flop means through the input terminal D1 is provided to the output terminal Q1 of the first flip-flop means DFF1, and when the second square wave clock pulse is input, the output signal of the first flip-flop means is provided to the output terminal Q2 of the second flip-flop means DFF2, and when the third square wave clock pulse is input, the output signal Q2 of the second flip-flop means is provided to the output terminal Q3 of the third flip-flop means DFF3.

Hence, when three square wave clock pulses are input, the input data signal is transferred to the output terminal Q3 of the third flip-flop means. Since the input data signal is high, when the three square wave clock pulses are input, the data of the output terminal Q3 is high and the value of the inverting output terminal QB3 becomes low. Since the QB3 is low, the output terminal outputs a signal to use the mode. Therefore, when the comparator generates more than a specified amount of square wave signals, the motor detects that the motor is rotating, and operates in the running mode, and not in the start up mode.

Hence, when the motor is rotating according to the above-noted method, efficient motor drive is achieved by switching to the running mode and not using the start up mode to generate a BEMF.

The sensorless BLDC motor according to the present invention adopts a digital method to detect the rotation of the motor by a comparator, so that errors caused by the detecting the rotation of the motor can be reduced, and installed capacitors of conventional sensorless BLDC motors may be removed.

Additionally, the present invention checks whether or not the motor is rotating and then terminates the start up interval.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A circuit for driving a sensorless brushless direct current (BLDC) motor to detect whether a state of the motor is one of stopped and rotating, the circuit comprising:

a comparator, receiving a phase voltage through a first input terminal and receiving a neutral point voltage through a second input terminal;

flip-flop means for receiving an output of the comparator through a clock signal input terminal, wherein the flip-flop means for receiving is directly coupled to the comparator, and for receiving a reset signal through a reset signal input terminal; and a flip-flop unit comprised of a plurality of the flip-flops means.

2. The circuit of claim 1, wherein said comparator outputs a logical high value when the input signal provided to the first input terminal is greater than the input signal provided to the second input terminal, and outputs a low logical value when the input signal provided to the second input terminal is equal or greater than the input signal provided to the first input terminal.

3. The circuit of claim 1, wherein said plurality of flip-flops means are coupled in series.

4. The circuit of claim 1, wherein said sensorless BLDC motor starts to drive with a running mode when the output data of the output terminal of the last flip-flop means is the data provided to the input terminal of the first flip-flop means.

5. In a sensorless brushless direct current (BLDC) motor system, a method to quickly switch from a start up mode to a drive mode, the method comprising:
   (i) presenting a BLDC motor device having a data input coupled to a drive mode and a phase voltage output, wherein the drive mode is positioned in the start up mode;
   (ii) presenting one comparator having a noninverting input coupled to the BLDC motor phase voltage output, having an inverting input coupled to a neutral voltage, and having a clock output;
   (iii) presenting a series of a plurality of flip flop devices DFF(1) to DFF(n), wherein the flip flop DFF(1) includes a data input, wherein each of the flip flops DFF(1) to DFF(n-1) includes a noninverting output coupled to a downstream data input of an adjacent flip flop, wherein the flip flop DFF(n) includes an inverting output coupled to the BLDC motor data input, and wherein each of the flip flops DFF(1) to DFF(n) includes a clock input coupled to the comparator clock output;
   (iv) setting the noninverting output of each flip flop to low;
   (v) setting an incremental value i equal to one (i=1);
   (vi) receiving at the comparator noninverting input a phase voltage;
   (vii) comparing the phase voltage to the neutral voltage;
   (viii) (a) outputting a high clock signal on the comparator clock output if the phase voltage is higher than the neutral voltage, or
   (viii) (B) outputting a low clock signal on the comparator clock output if the phase voltage is lower than the neutral voltage;
   (ix) receiving a data signal at the flip flop DFF(i−(i−1)) noninverting input and the clock signal at the flip flop DFF(i−(i−1)) inverting input;
   (x) transmitting the data signal from the flip flop DFF(i−(i−1)) to an adjacent device if the clock signal received at the flip flop DFF(i−(i−1)) inverting input is a high clock signal; and
   (xi) (a) increasing the incremental value i by one and returning to step (vi) if the clock signal received at the flip flop DFF(n) inverting input is a low clock signal, or
   (xi) (b) switching the drive mode of the BLDC motor device to the running mode if the data signal is received at the BLDC motor device data input.

6. The method of claim 5, wherein n=3 and wherein presenting a series of a plurality of flip flop devices DFF(1) to DFF(n) includes presenting a series of a plurality of flip flop devices DFF(1) to DFF(3).

7. A sensorless brushless direct current (BLDC) motor system to quickly switch from a start up mode to a drive mode, the system comprising:
   a BLDC motor device having a data input coupled to a drive mode and a phase voltage output;
   one comparator having a noninverting input coupled to the BLDC motor phase voltage output, having an inverting input coupled to a neutral voltage, and having a clock output;
   a series of a plurality of flip flop devices DFF(1) to DFF(n), wherein the flip flop DFF(1) includes a data input, wherein each of the flip flops DFF(1) to DFF(n−1) includes a noninverting output coupled to a downstream data input of an adjacent flip flop, wherein the flip flop DFF(n) includes an inverting output coupled to the BLDC motor data input, and wherein each of the flip flops DFF(1) to DFF(n) includes a clock input coupled to the comparator clock output.

8. The system of claim 7, wherein the drive mode is positioned in the start up mode.

9. The system of claim 7 wherein n=3 so that the series of a plurality of flip flop devices DFF(1) to DFF(n) includes three flip flop devices DFF(1) to DFF(3).

10. The system of claim 7 wherein each of the flip flops DFF(1) to DFF(n) includes a reset input coupled to a reset signal.

* * * * *